US008245025B2

(12) United States Patent
Huang et al.

(10) Patent No.: US 8,245,025 B2
(45) Date of Patent: Aug. 14, 2012

(54) COMPUTER MOTHERBOARD WITH BASIC INPUT OUTPUT SYSTEM CAPABLE OF BUILT-IN CONFIGURATION DISPLAY

(75) Inventors: Pai-Lin Huang, Jung-Ho (TW); Rong-Jian Kuang, Kunshan (CN); Ming-Chung Hsieh, Jung-Ho (TW)

(73) Assignee: MSI Electronic (Kun Shan) Co. Ltd., Funshan (CN)

( * ) Notice: Subject to any disclaimer, the term of this patent is extended or adjusted under 35 U.S.C. 154(b) by 415 days.

(21) Appl. No.: 12/555,418

(22) Filed: Sep. 8, 2009

(65) Prior Publication Data
US 2010/0275000 A1    Oct. 28, 2010

(30) Foreign Application Priority Data

Apr. 28, 2009 (TW) .............................. 98113971 A

(51) Int. Cl.
*G06F 15/177* (2006.01)
(52) U.S. Cl. ............................................... 713/2; 713/1
(58) Field of Classification Search ........................ None
See application file for complete search history.

(56) References Cited

U.S. PATENT DOCUMENTS

2005/0144432 A1*  6/2005 Wu ..................................... 713/2
2005/0177710 A1*  8/2005 Rothman et al. ................... 713/2
2007/0118714 A1*  5/2007 Pan et al. ...................... 711/170

OTHER PUBLICATIONS

CPU-Z by CPUID, version 1.41, Sep. 4, 2007, pp. 1-4, http://web.archive.org/20071029135750/http://www.cpuid.com/cpuz.php.*

* cited by examiner

*Primary Examiner* — Dennis M Butler
(74) *Attorney, Agent, or Firm* — Ming Chow; Sinorica, LLC

(57) ABSTRACT

The present invention is a computer motherboard with a Basic Input Output System (BIOS) capable of built-in configuration display, characterized in that the BIOS includes a first means and a second means. The first and second means are code internally provided in the BIOS and executable by a CPU of the computer motherboard in an execution environment preset by the BIOS. The first means enables acquisition of CPU configuration data stored on the CPU and configuration data for displaying the CPU. The second means enables acquisition of memory module configuration data stored on at least a memory module and configuration data for displaying the memory module. After the computer motherboard enters a BIOS setup utility, a user selects an option of execution of the first or second means to execute CPU and memory configuration display without using an operating system.

8 Claims, 8 Drawing Sheets

COMPUTER MOTHERBOARD WITH BASIC INPUT OUTPUT SYSTEM CAPABLE OF BUILT-IN CONFIGURATION DISPLAY

FIELD OF THE INVENTION

The present invention relates to computer motherboards, and more particularly, to a computer motherboard with a Basic Input Output System (BIOS) capable of built-in configuration display.

BACKGROUND OF THE INVENTION

Despite its interfaces, a conventional Basic Input Output System (BIOS) does not give a complete picture of a central processing unit (CPU) and memory but only displays some usual functional information thereof. CPUs and memory are increasingly powerful and therefore involve creating an increasingly large amount of information. To gain insight into information related to the CPU and memory installed in a computer system, a user has to execute a special software under an operating system and look for the information of the CPU and memory. The user cannot, however, peruse the information related to the CPU, memory, and their functions after gaining access to the BIOS settings during a boot procedure performed on the computer system.

Conventional CPU-Z application software enables users to gain insight into information related to the CPU and memory installed in the computer system. However, to execute conventional CPU-Z application software, a computer motherboard has to enter the operating system. Information about conventional CPU-Z application software is available on the Website http://www.cpuid.com/cpuz.php.

The inventor of the present invention realized the aforesaid drawbacks of the conventional computer motherboard and endeavored to overcome the aforesaid drawbacks by inventing a computer motherboard with a BIOS capable of built-in configuration display whereby a user selects, upon entry into a BIOS setup utility, an option of executing operation of built-in configuration display so as for configuration of the CPU and memory to be displayed without using an operating system.

SUMMARY OF THE INVENTION

It is the objective of the present invention to provide a computer motherboard with a Basic Input Output System (BIOS) capable of built-in configuration display whereby a user selects, upon entry into a BIOS setup utility, an option of executing operation of built-in configuration display so as for configuration of the CPU and memory to be displayed without using an operating system.

To achieve the above and other objectives, the present invention provides a computer motherboard with a BIOS capable of built-in configuration display. The computer motherboard comprises the BIOS, a central processing unit (CPU), and at least a memory module, characterized in that the BIOS comprises: a first means being code integral to the BIOS and executable by the CPU of the computer motherboard upon entry into an execution environment preset by the BIOS so as to enable acquisition of CPU configuration data stored on the CPU and configuration data for displaying the CPU, wherein the configuration data of the CPU comprise a type of cache memory, quantity of cache memory, and a type of support for multimedia extensions; and a second means being code integral to the BIOS and executable by the CPU upon entry into an execution environment preset by the BIOS so as to enable acquisition of memory module configuration data stored on the at least a memory module and configuration data for displaying the at least a memory module, wherein the memory module configuration data each comprises Serial Presence Detect (SPD) data stored on the at least a memory module.

BRIEF DESCRIPTION OF THE DRAWINGS

To enable persons skilled in the art to gain insight into the structures, features, and effects of use of the present invention, the present invention is hereunder illustrated with preferred embodiments in conjunction with the accompanying drawings, wherein.

DETAILED DESCRIPTION OF THE INVENTION

Figure 1:
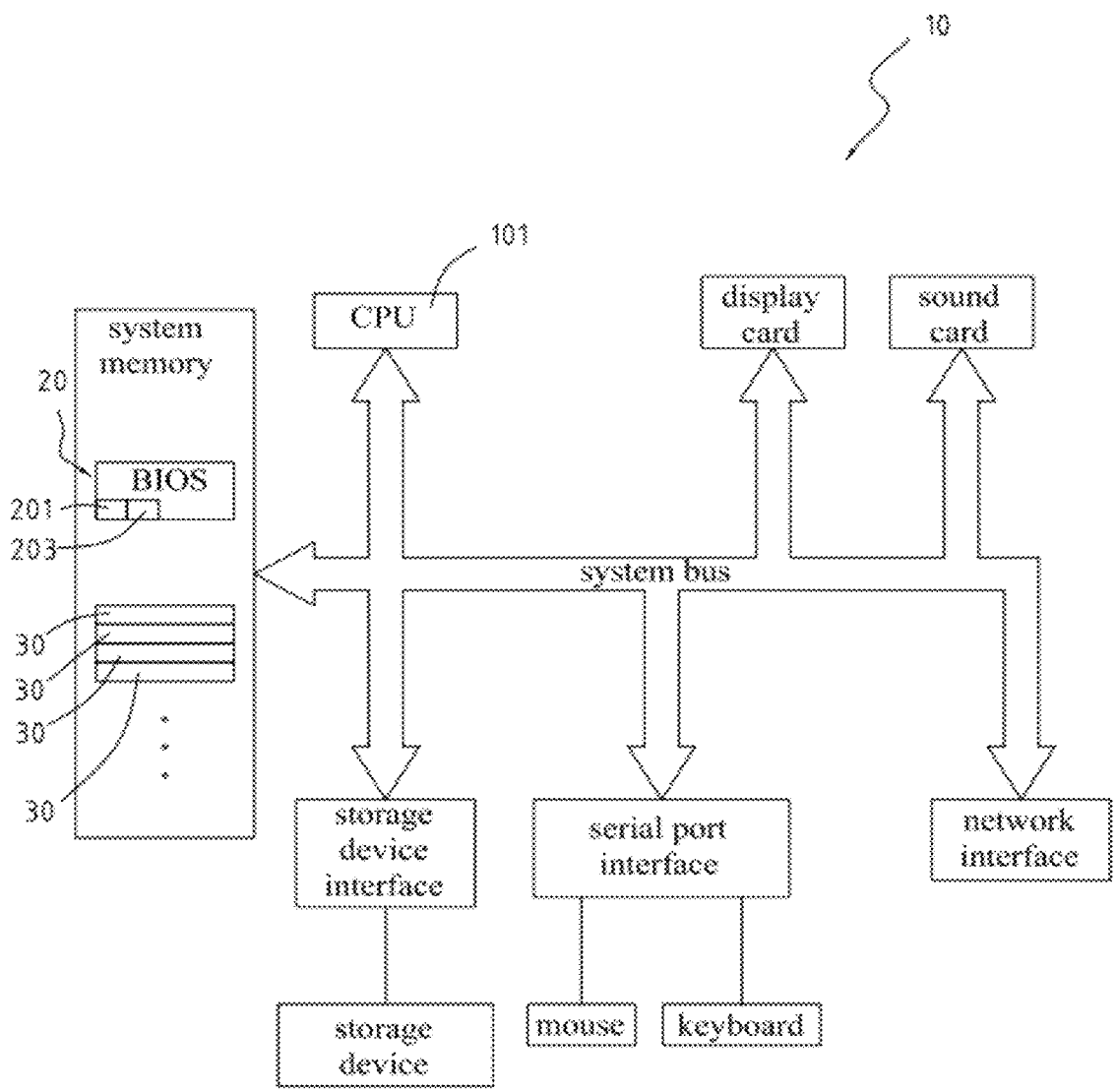
FIG. 1 is a schematic view of the framework of a computer motherboard of the present invention.

Referring to FIG. 1, which is a schematic view of the framework of a computer motherboard of the present invention, a computer motherboard 10 of the present invention is characterized in that: a Basic Input Output System (BIOS) 20 is capable of built-in configuration display so as to allow a user to enter the BIOS screen after the computer is powered on (for example, by pressing the Del key on a keyboard) and gain insight into information related to a central processing unit (CPU), memory and functions thereof by following operation instructions displayed on the BIOS screen.

The computer motherboard 10 of the present invention comprises the BIOS 20, a central processing unit (CPU) 101, and at least a memory module 30. Unlike a conventional BIOS, the BIOS 20 comprises a first means 201 and a second means 203. The computer motherboard 10 of the present invention is described hereunder.

The first means 201 is code integral to the BIOS 20. The first means 201 is executable by the CPU 101 of the computer motherboard 10. In an execution environment of the BIOS 20, the CPU 101 executes the first means 201 and thereby enables acquisition of CPU configuration data stored on the CPU 101 and configuration data for displaying the CPU 101. The CPU configuration data displayed by means of the first means 201 comprises a type of cache memory, quantity of cache memory, and a type of support for multimedia extensions.

The second means 203 is code integral to the BIOS 20. The second means 203 is executable by the CPU 101 of the computer motherboard 10. In an execution environment of the BIOS 20, the CPU 101 executes the second means 203 and thereby enables acquisition of memory module configuration data stored on the memory modules 30 and configuration data for displaying the memory modules 30. The memory module configuration data displayed by means of the second means 203 each comprises Serial Presence Detect (SPD) data stored on the at least a memory module 30.

Figure 2:
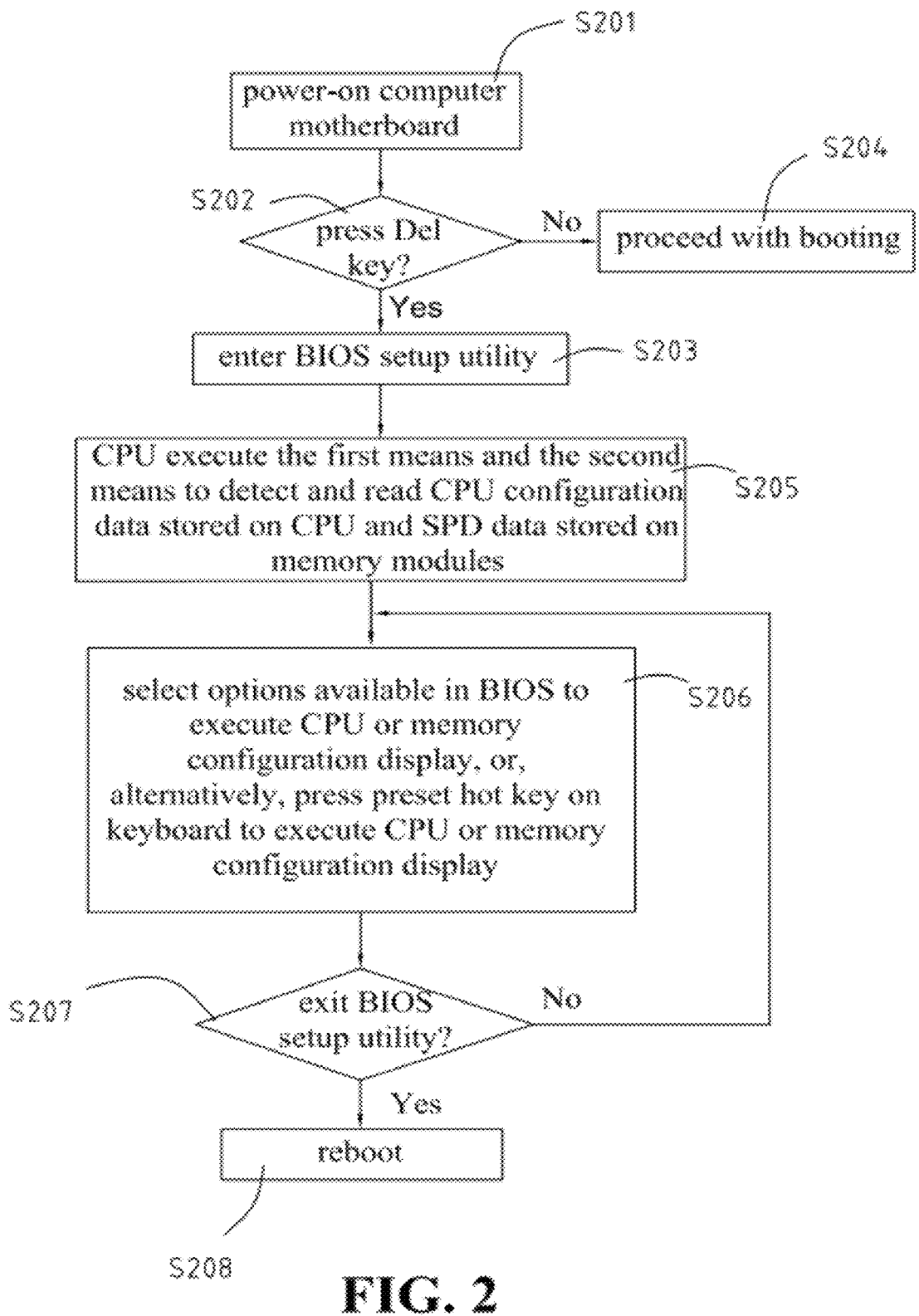
FIG. 2 is a flow chart of configuration display executed by the computer motherboard of the present invention.
Figure 3:
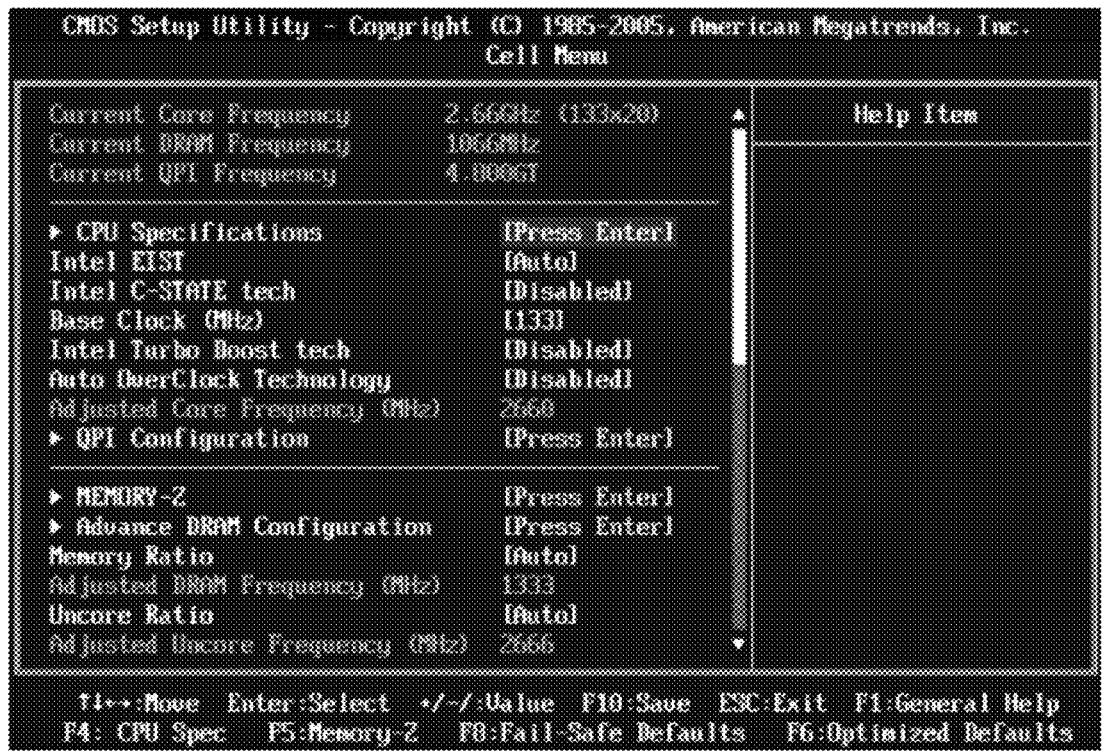
FIG. 3 is a screen shot of commencement of operation of configuration display upon a user's entry into a BIOS setup utility in step S203 of the present invention.

Referring to FIG. 2, which is a flow chart of configuration display executed by the computer motherboard 10 of the present invention, after the computer motherboard 10 is powered on (S201), the BIOS 20 checks the keyboard to determine whether the Del key has been pressed (S202), and a TRUE determination is followed by entry into a BIOS setup utility (S203), or else booting continues (S204). Referring to FIG. 3, which is a screen shot of commencement of operation of configuration display upon the user's entry into a BIOS setup utility in step S203 of the present invention, the CPU 101 executes the first means 201 and the second means 203 to detect and read the CPU configuration data stored on the CPU 101 and the Serial Presence Detect (SPD) data stored on the at least a memory module 30 (S205).

Afterward, the user selects options available in the BIOS 20 to execute CPU or memory configuration display, or, alternatively, the user presses a preset hot key on the keyboard to execute CPU or memory configuration display (S206).

Figure 4:
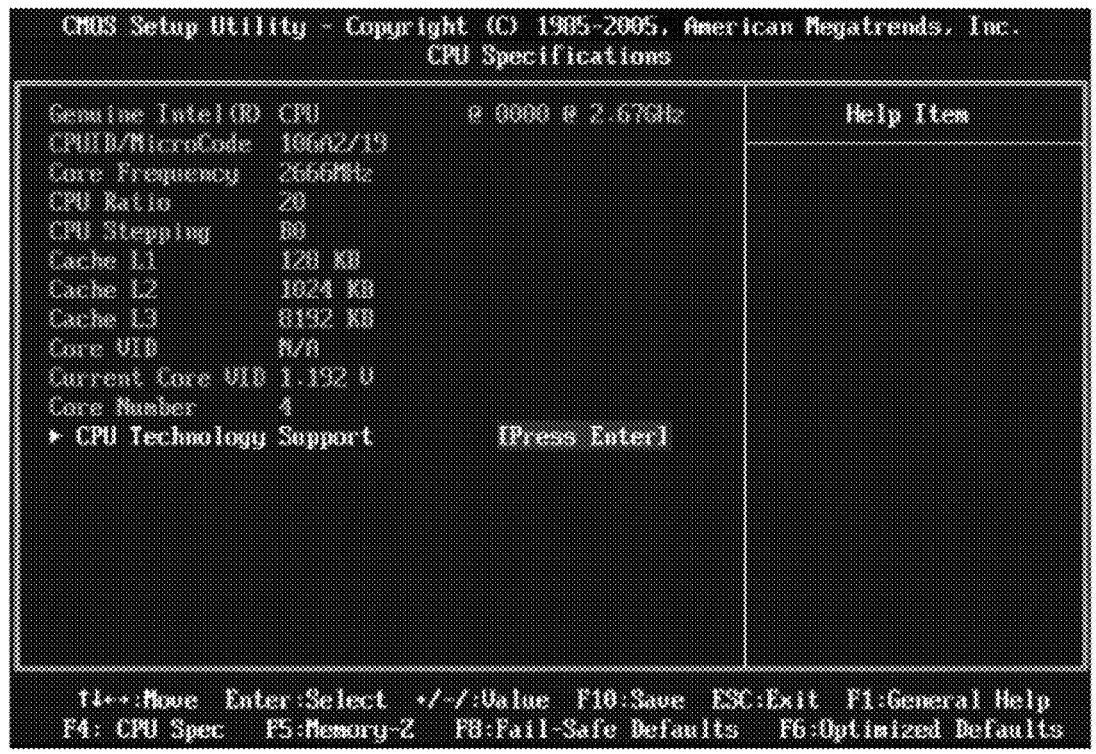
FIGS. 4 and 5 are screen shots of the user's selection of CPU configuration display options in the BIOS of the computer motherboard and resultant execution of CPU configuration display according to the present invention.
Figure 5:
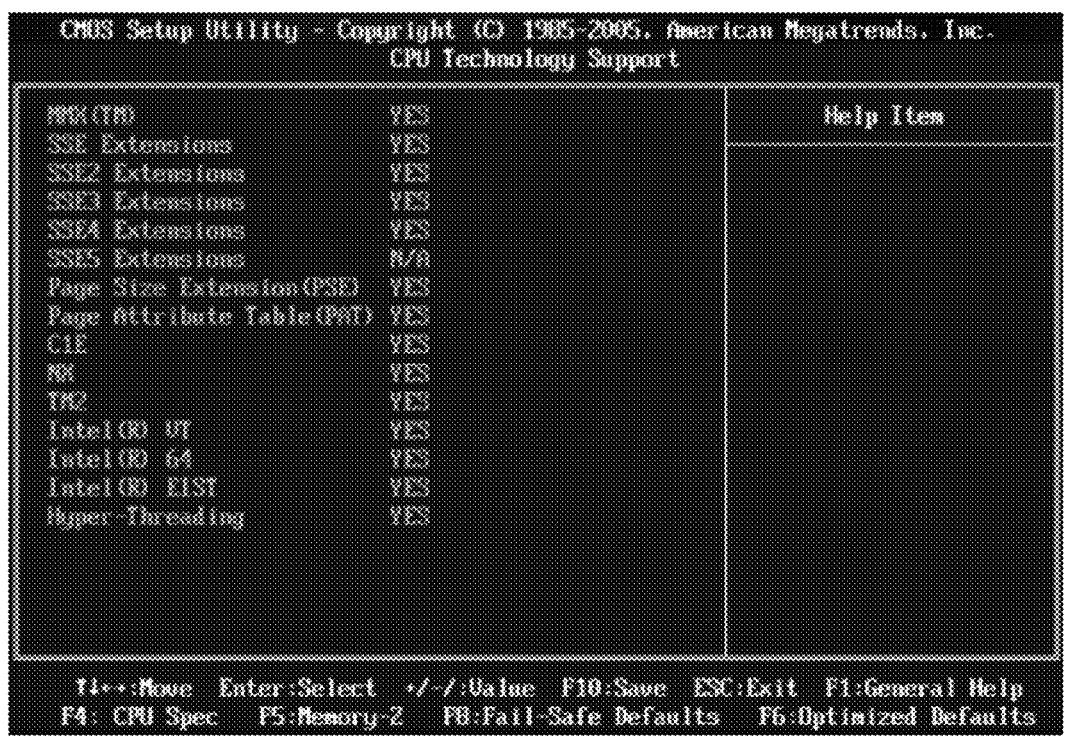
Figure 6:
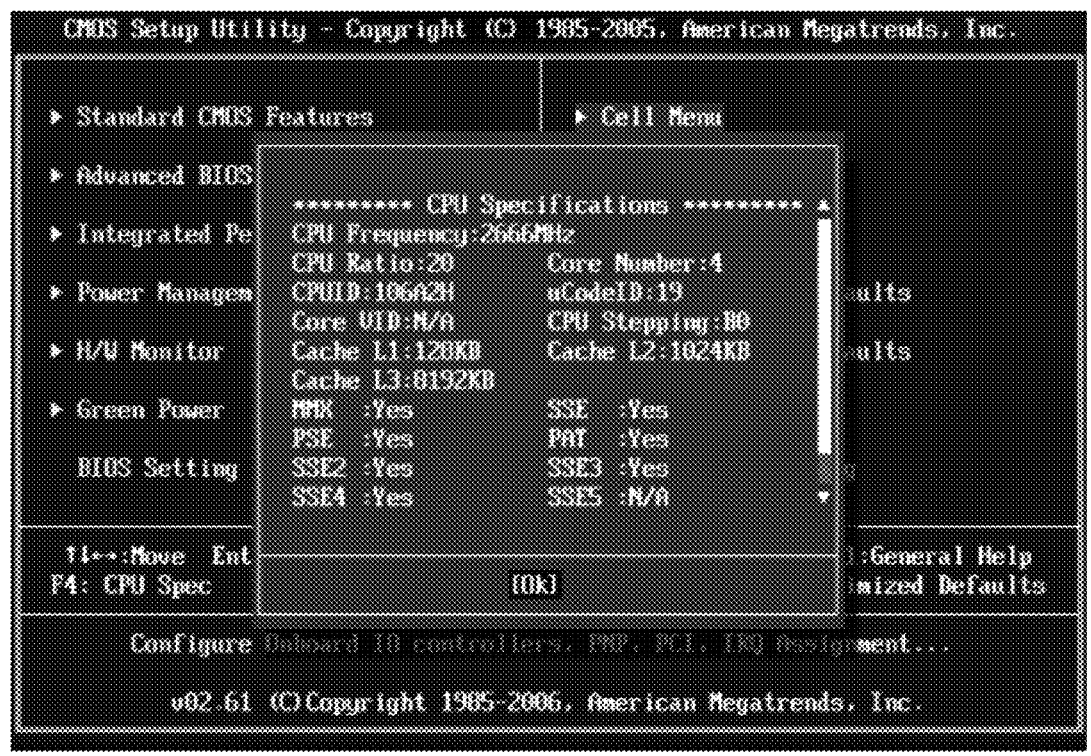
FIG. 6 is a screen shot of the user's pressing a preset hot key in the BIOS of the computer motherboard and resultant execution of CPU configuration display according to the present invention.

Referring to FIG. 3 again, in step S205, the user selects CPU configuration display options available in the BIOS 20 to execute CPU configuration display. Referring to FIGS. 4 and 5, the CPU 101 executes the first means 201 to display the CPU configuration data. Referring to FIG. 6, alternatively, the user presses a preset hot key, such as key F4, on the keyboard to execute CPU configuration display.

Figure 7:
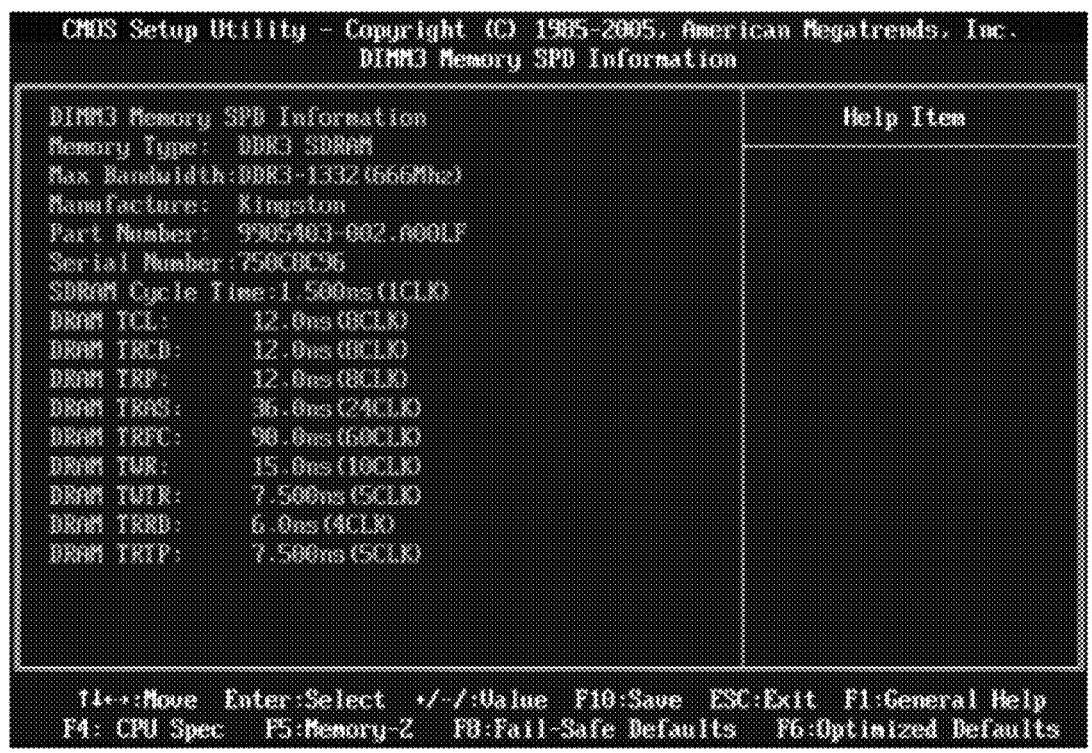
FIG. 7 is a screen shot of the user's selection of memory configuration display options in the BIOS of the computer motherboard and resultant execution of display of Serial Presence Detect (SPD) data stored on the at least a memory module according to the present invention.
Figure 8:
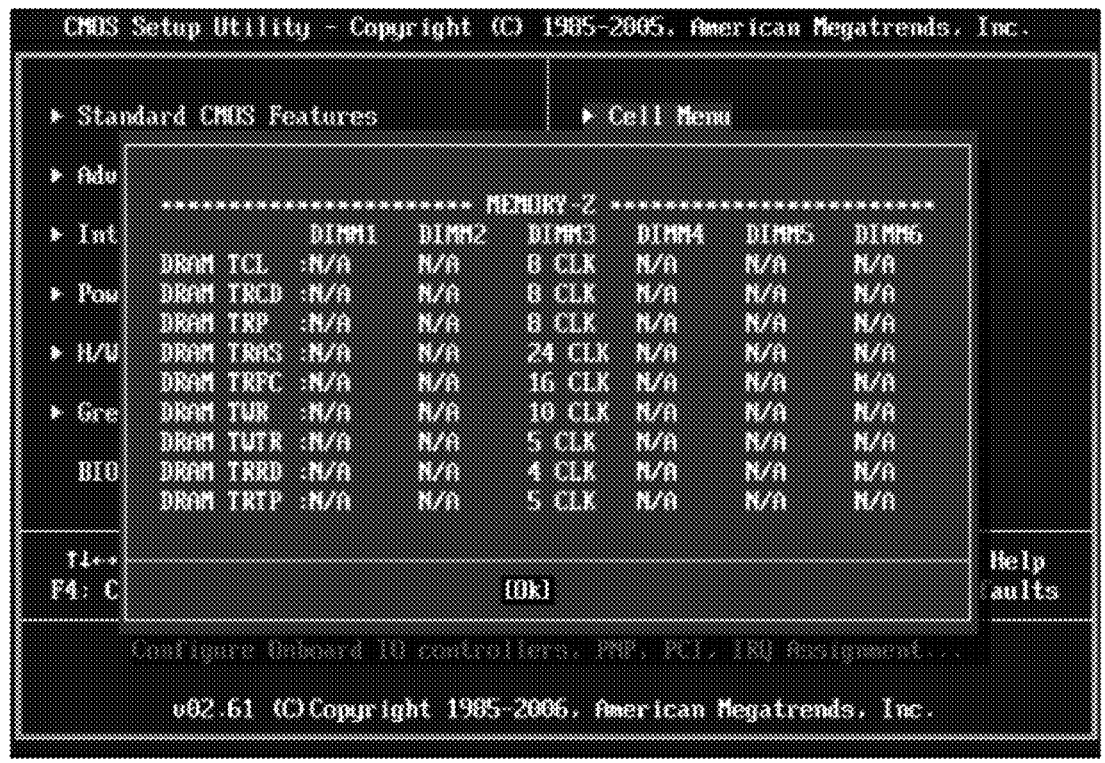
FIG. 8 is a screen shot of the user's pressing a preset hot key in the BIOS of the computer motherboard and thereby determining whether the memory modules have been inserted into memory slots according to the present invention.

Referring to FIG. 3 again, in step S205, the user selects memory configuration display options available in the BIOS 20 to execute memory configuration display. Referring to FIG. 7, the CPU 101 executes the second means 203 to display the SPD data of the memory module 30. Referring to FIG. 8, the user presses a preset hot key, such as key F5, on the keyboard to determine whether the memory modules 30 have been inserted into memory slots.

Step S207 involves determining whether to exit the BIOS setup utility, wherein a TRUE determination is followed by rebooting the computer motherboard 10 (S208), and a FALSE determination is followed by going back to step S206.

The type of support for multimedia extensions depends on the CPU 101 and is, for example, one selected from the group consisting of multimedia extensions (MMX), Streaming SIMD Extensions (SSE), Streaming SIMD Extensions 2 (SSE2), Streaming SIMD Extensions 3 (SSE3), Streaming SIMD Extensions 4 (SSE4), and Streaming SIMD Extensions 5 (SSE5).

The CPU configuration data depend on the CPU 101 and further comprise support for a page attribute table (PAT), support for a page size extension (PSE), and a version of a memory controller.

The at least a memory module 30 is, for example, a single in-line memory module (SIMM) or a double in-line memory module (DIMM).

The computer motherboard of the present invention enables detailed information related to a CPU and memory to be displayed in a BIOS and enables users to gain insight into performance of the CPU and memory without using an operating system—the advantages of the present invention.

The above description serves to expound preferred embodiments of the present invention rather than limit the scope of application of the present invention. Persons skilled in the art should be able to make obvious changes or modification of the present invention without departing from the substantive disclosure of the present invention.

What is claimed is:

1. A computer motherboard with a Basic Input Output System (BIOS) capable of built-in configuration display, wherein the computer motherboard comprises the BIOS, a central processing unit (CPU), and at least a memory module, characterized in that the BIOS comprises:
   a first means being code integral to the BIOS and executable by the CPU of the computer motherboard upon entry into an execution environment preset by the BIOS so as to enable acquisition of CPU configuration data stored on the CPU and display the CPU configuration data, wherein the CPU configuration data comprise a type of cache memory, quantity of cache memory, and a type of support for multimedia extensions; and
   a second means being code integral to the BIOS and executable by the CPU upon entry into an execution environment preset by the BIOS so as to enable acquisition of memory module configuration data stored on each the memory modules and display the memory module configuration data of each the memory modules, wherein the memory module configuration data comprise Serial Presence Detect (SPD) data stored on the memory module.

2. The computer motherboard of claim 1, wherein the type of support for multimedia extensions is one selected from the group consisting of multimedia extensions (MMX), Streaming SIMD Extensions (SSE), Streaming SIMD Extensions 2 (SSE2), Streaming SIMD Extensions 3 (SSE3), Streaming SIMD Extensions 4 (SSE4), and Streaming SIMD Extensions 5 (SSE5).

3. The computer motherboard of claim 1, wherein the CPU configuration data further comprise support for a page attribute table (PAT) and support for a page size extension (PSE).

4. The computer motherboard of claim 1, wherein the CPU configuration data further comprise a version of a memory controller.

5. The computer motherboard of claim 1, wherein the first means is executed when triggered by a hot key of a keyboard in an execution environment preset by the BIOS.

6. The computer motherboard of claim 1, wherein the second means is executed when triggered by a hot key of a keyboard in an execution environment preset by the BIOS.

7. The computer motherboard of claim 1, wherein the memory module is a single in-line memory module (SIMM).

8. The computer motherboard of claim 1, wherein the memory module is a double in-line memory module (DIMM).

* * * * *